April 21, 1953 G. P. GRIEVE ET AL 2,635,756
CRANKCASE DRAINING AND FLUSHING APPARATUS
Filed Nov. 23, 1949 3 Sheets-Sheet 1

INVENTORS.
George Price Grieve
BY Trillie Lee Hendry
Albert G. McCaleb
Att'y

April 21, 1953 G. P. GRIEVE ET AL 2,635,756
CRANKCASE DRAINING AND FLUSHING APPARATUS
Filed Nov. 23, 1949 3 Sheets-Sheet 2
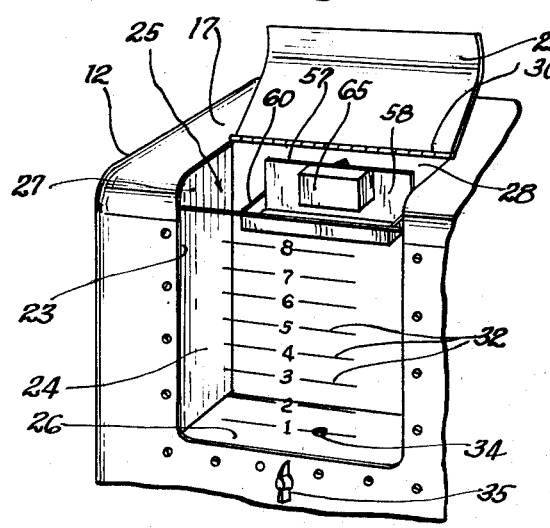
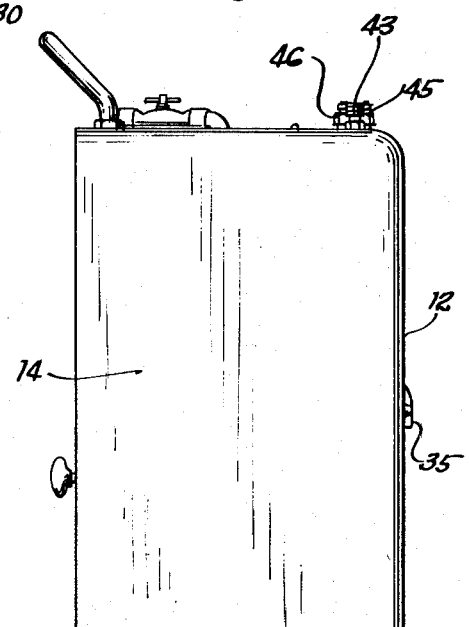
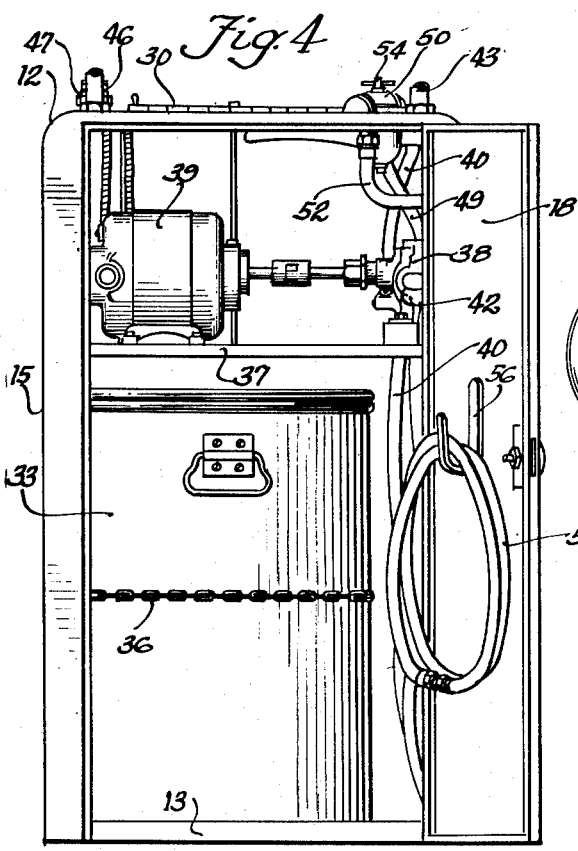
INVENTORS.
George Price Grieve
Trillie Lee Hendry
BY Albert G. McCaleb
Atty

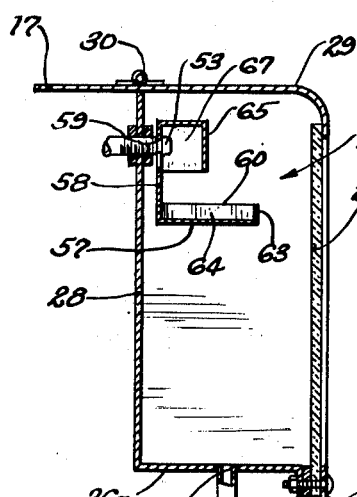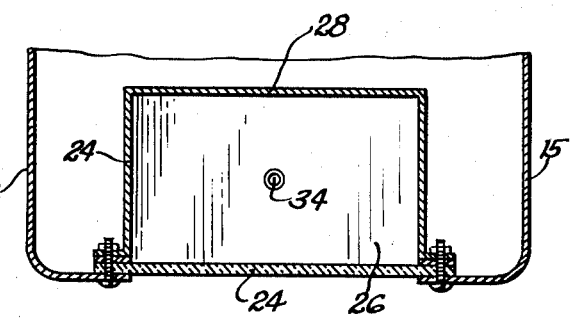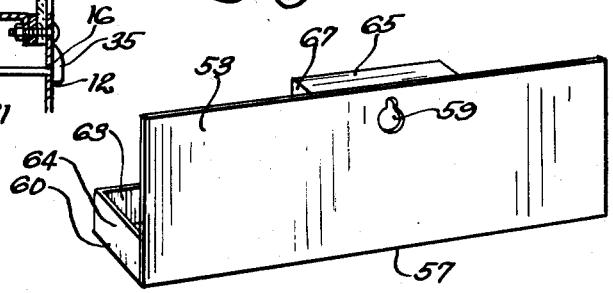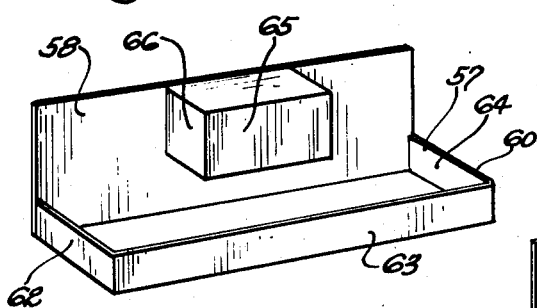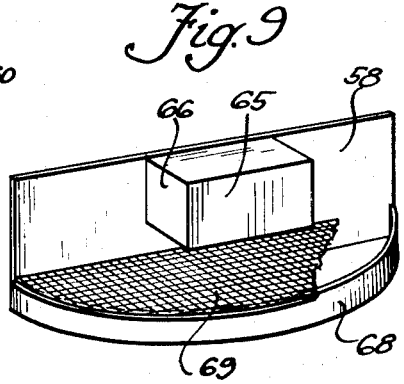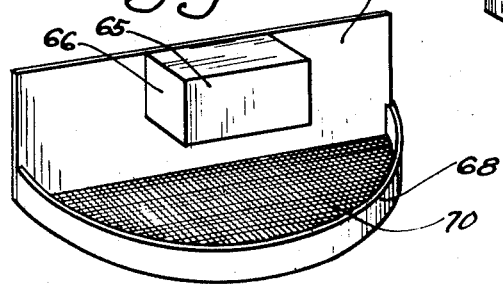
INVENTORS.
George Price Grieve
Trillie Lee Hendry
BY Albert G. McCaleb
Att'y Patented Apr. 21, 1953

2,635,756

UNITED STATES PATENT OFFICE 2,635,756

CRANKCASE DRAINING AND FLUSHING APPARATUS

George Price Grieve, Glenview, and Trillie Lee Hendry, Chicago, Ill.

Application November 23, 1949, Serial No. 129,038

2 Claims. (Cl. 210—52)

This invention relates to crank case draining and flushing apparatus, and more particularly to such apparatus which, in addition to being fast and efficient in its operation, is portable and provides effective indications of the quantity and condition of the oil taken from or flushed through the crank case.

It is a general object of this invention to provide portable apparatus having parts which are not only visible before, during and after the flow of oil thereto from a source, such as a crank case, but which are readily accessible and adapted to the determination of the cleanness of the oil.

As another object, our invention has within its purview the provision of crank case draining and flushing apparatus which embodies an easily cleaned and readily removable part over which oil flows during a draining or flushing operation, and which is adapted to the collection of sediment from the oil, so as to provide an indication of the cleanness of the oil and condition of the oil filter.

Our invention has for a further object the provision of a sediment collecting trap in crank case draining and flushing apparatus, which trap is visible before, during and after the draining or flushing operation and which is easily and readily removable for close inspection, when desired.

Other objects and advantages of the invention will be apparent from the following description and the accompanying drawings in which similar characters of reference indicate similar parts throughout the several views.

Referring to the three sheets of drawings,

Fig. 2 is a fragmentary perspective view of a portion of the apparatus depicted in Fig. 1 with certain parts in positions different from those of Fig. 1;

Fig. 3 is a side elevational view of the apparatus shown in Fig. 1;

Fig. 4 is a fragmentary rear elevational view of the apparatus with a rear door open;

Figure 1:
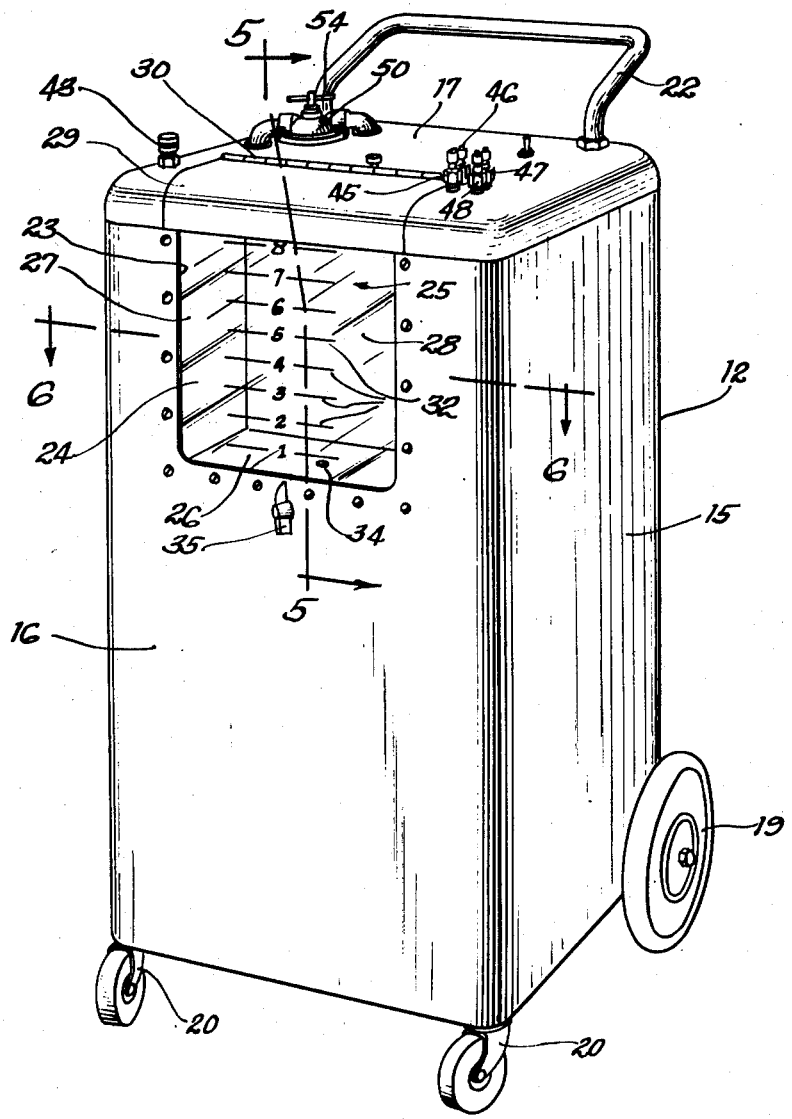
Fig. 1 is a perspective view taken from in front and somewhat to one side of crank case draining and flushing apparatus embodying a preferred form of our invention.

Figs. 5 and 6 are respectively side and top sectional views of portions of the apparatus, wherein the sections are taken substantially at the positions indicated by lines 5—5 and 6—6 of Fig. 1;

Figs. 7 and 8 are perspective views taken respectively from the rear and front of a removable sediment collecting pan utilized in the preferred embodiment of our invention; and Figs. 9 and 10 are perspective views taken from in front of sediment collecting pans which embody modifications of the structure illustrated in Figs. 7 and 8.

Considered generally, the exemplary embodiment of our invention which is disclosed herein for illustrative purposes comprises a unitary and portable structure adapted easily to be moved to a position of use near a vehicle or the like and in which it may be conveniently observed during operation. Externally, the unit has a housing 12 including a base panel 13, side panels 14 and 15, a front panel 16 and a top panel 17. Preferably, the rear of the housing is normally closed by a door 18 which is hingedly mounted for swinging movement relative to one of the side walls of the housing. In order to facilitate the movement of the unit to a position of use, the housing 12 has wheels 19 at the back and casters 20 at the front; a handle 22 being secured to the back portion of the top panel 17 through which manual force is applied for moving the unit.

At the top of the front panel 16, an opening 23 is cut therein, which opening is covered by a transparent wall 24 of glass or suitable transparent plastic material which extends upwardly to substantially the height of the front panel. The transparent wall 24 forms a part of a container 25 which, in addition, has a bottom wall 26, side walls such as 27, and a back wall 28. Except for the transparent wall 24, the other walls of the container and the panels of the housing are made of sheet metal; the various walls of the container being joined and sealed together so as to be liquid tight. In the disclosed structure, we have provided a cover 29 movably connected to the top panel 17 for upward swinging by a hinge 30. This cover normally closes the top of the container 25 and provides for convenient access to the interior thereof. Preferably, graduations 32 are provided on the transparent wall of the container to indicate the quantity of liquid therein.

Within the housing 12, a waste liquid drum 33 is carried by the base panel 13 at a position directly below the container 25 and such that it receives liquid from an outlet passage 34 in the bottom wall 26 of the container when a valve 31 controlled by a knob 35 is opened. By preference, the disclosed structure includes a flexible tie, in the form of a chain 36 secured to the side wall 15 of the housing for securing the waste liquid drum in place within the housing. Above the waste liquid drum 33 and to the rear of the container 25, a shelf 37 is secured within the housing and supported by the side walls thereof. This shelf carries a pump 38, which may be of the gear type, and which is driven by a motor 39.

In order to avoid the necessity of placing an automobile on a grease rack or over a pit for draining the lubricant from the crank case, and in fact to avoid the necessity of removing the usual drain plug which is usually located at a place which is difficult for a person to get to, we prefer to remove the crank case oil through a readily accessible opening and by the action of the pump 38. Thus, we provide a flexible hose 40, which is normally coiled or looped within the housing 12, and extends to a suction port 42 of the pump 38. This hose also extends through an opening in the top panel 17 of the housing and has on its end, outside of the housing, a coupling 43, which coupling is adapted to quick attachment to any one of several different nozzles which are adapted in size and length to insertion into a crank case opening, such as that normally occupied by an oil measuring stick. For convenience, such nozzles 45, 46, 47 and 48 of the various required sizes are carried in apertures in the top panel 17 of the housing and supported therein by couplings which are suited to quick attachment to the coupling 43 on the hose. In any instance, use is made of the largest of the nozzles 45, 46, 47 or 48 which will fit into the accessible crank case opening. With the hose 40 withdrawn from the housing and having a suitable one of the nozzles connected thereto and inserted into the crank case opening, the oil or cleaning liquid is drawn from the crank case by the action of the pump. A filter 50, in the present instance, has a hose connection 52 thereon, and is connected between the hose 40 and the inlet side of the pump 38.

The output side of the pump 38 is connected through a suitable hose or conduit 49 to a fitting 53 (Fig. 5) which serves as an inlet passage to the container 25 and, in the disclosed structure, is located near the top of the mid-portion of the back wall 28 of that container. With the structure as thus far described, it may be readily understood that liquid pumped from a crank case through the hose 40 is forced into the container 25 through the inlet passage provided by the fitting 53. With the transparent front wall in the container 25, the flow of material into the container can be watched, and with the calibrations on the transparent wall, the quantity of liquid pumped from the crank case may be observed at a glance. The filter 50 is one of a type which is preferably provided with a handle or knob 54 exposed on the top of the housing for the unit, so that its filtering action may be utilized or dispensed with, at will. When used crank case oil is being pump from a crank case into the container 25, the filtering action of the filter 50 is generally dispensed with, so that the sludge, grit and foreign matter carried by and with the oil can be observed, so as to indicate the cleanness of the oil and the need of a new engine filter.

When a crank case is to be flushed, as well as drained for a change of oil, the used crank case oil is pumped into the container 25, as described. A second piece of hose 55, which may be coiled and conveniently stored in the housing 12 on a hook 56 which is secured to the inner surface of the door 18, is connected at one end to the fitting 53 in the container 25. After pouring a quantity of flushing oil into the filling opening of the engine being serviced, the other end of the hose 55 is placed in that filling opening. With these connections and with the draining nozzle remaining in the crank case opening, the pump 38 is operated to circulate the flushing oil while the engine is being run slowly. This circulates the flushing oil while the engine is running. When the flushing oil is to be removed, the hose 55 is disconnected from the fitting 53 and the flushing oil is drained into the container 25. During such a flushing operation, the filter 50 is generally used as such, so as to keep the flushing oil as clean as possible.

In order to provide a clear and effective indication of the amount of grit or sludge which is present in used oil drained from a crank case, we have provided a sediment collecting pan 57 through or over which the liquid flows in its passage from the fitting 53 into the container 25, thereby to collect from the oil a representative sample of the sediment which it contains. Further to make effective use of this sediment collecting pan, it is desirably placed at a position in which it may be readily observed before, during and after the draining operation, so that it may be shown to be clean before the draining operation is commenced. As another feature, the sediment collecting pan in the disclosed structure is removable, so that it can be taken from the container 25 after a draining operation to be shown to an interested person at close range.

In the form depicted in Figs. 2, 5, 7 and 8, the sediment collecting pan includes a back support plate 58 provided with an opening 59 at the mid-portion of the top thereof through which the fitting 53 extends to support the sediment collecting pan within the container 25. At the bottom of the back support plate 58, a tray portion 60 extends outwardly in substantially right angular relationship to the back support plate and is provided with marginal flanges 62, 63 and 64 which extend upwardly and are joined together, as well as to the back plate, to define a shallow container for collecting sediment and a sample of the oil. A baffle 65 extends outwardly and downwardly from the back support plate 58 and over the end of the fitting 53 to deflect the flow of oil from the fitting 53 downwardly into the shallow container. Preferably, the end portions of the baffle 65 are closed by end plates 66 and 67. With the parts thus arranged, all of the oil flowing into the container 25 passes into and across the sediment collecting pan so that a quantity of the sediment will be deposited therein, if there is an appreciable quantity of sediment in the oil.

In the form of our sediment collecting pan which is illustrated in Fig. 9, the structure includes a back support plate 58 and a baffle plate 65 like that illustrated and described in the sediment collecting pan of Figs. 7 and 8. However, a curved sheet metal strip 68 which is secured at its ends to the lower portion of the back support plate 58 serves as a support for a screen 69 extending across the upper surface of the strip. In this sediment collecting pan, all of the oil passes through or across the screen 69 as it flows into the container 25, and sediment is deposited upon the screen.

In the form of the sediment collecting pan shown in Fig. 10, the structure is substantially like that shown in Fig. 9, except that a screen 70 is secured to and extends across the lower surface of the strip 68, so that the strip forms a rim at the outer edge of the screen.

From the foregoing description and reference to the accompanying drawings, it may be readily understood that we have provided an efficient and effective crank case draining and flushing apparatus which is not only adapted to quick and convenient operation and to provide clearly visible indications of the flow and quantity of crank case oil during removal, but also to provide a definite and effective indication of the cleanness of the used oil taken from a crank case in a particular instance.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a crank case draining and flushing apparatus including a housing having a front wall; sediment collecting and inspecting means comprising a container adjacent the upper end of said housing having opposite vertical side walls and a horizontal bottom wall extending inwardly from said housing front wall and a rear wall parallel with and spaced from said front wall, and a transparent panel in said front wall opposed to said rear wall, a liquid inlet conduit extending through said rear wall in substantial vertically spaced relation to the bottom wall, a valve controlled outlet conduit communicating with the container through the bottom wall, a shallow sediment collecting tray supported from the rear wall in a horizontal position and at a relatively short distance below said inlet conduit and substantially below the top of said transparent panel for unobstructed visibility thereof, and a liquid deflector aligned with said inlet conduit and comprising vertical walls for deflecting the liquid from said inlet conduit into said tray.

2. The structure according to claim 1, wherein said tray includes a back wall of substantial height, said liquid deflector being rigidly supported on said back wall, and said back wall having a readily releasable connection with said inlet conduit for support of both the tray and liquid deflector therefrom.

GEORGE PRICE GRIEVE.
TRILLIE LEE HENDRY.

References Cited in the file of this patent

UNITED STATES PATENTS

| Number | Name | Date |
|---|---|---|
| 826,580 | Keyes | July 24, 1906 |
| 1,121,270 | McDermott | Dec. 15, 1914 |
| 1,505,148 | Kindle | Aug. 19, 1924 |
| 1,892,539 | Regensburger | Dec. 27, 1932 |
| 2,294,330 | Clark | Aug. 25, 1942 |
| 2,425,848 | Vawter | Aug. 19, 1947 |
| 2,446,587 | Henry | Aug. 10, 1948 |

FOREIGN PATENTS

| Number | Country | Date |
|---|---|---|
| 461,858 | France | Jan. 13, 1914 |
| 99,032 | Germany | Dec. 30, 1897 |
| 151,803 | Austria | Dec. 10, 1937 |